(12) United States Patent
Zhang et al.

(10) Patent No.: US 11,683,833 B2
(45) Date of Patent: Jun. 20, 2023

(54) SPATIAL LISTEN-BEFORE-TALK (LBT) WITH CHANNEL VARIATION CONSIDERATION

(71) Applicant: QUALCOMM Incorporated, San Diego, CA (US)

(72) Inventors: Xiaoxia Zhang, San Diego, CA (US); Taesang Yoo, San Diego, CA (US); Siddhartha Mallik, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 16/049,313

(22) Filed: Jul. 30, 2018

(65) Prior Publication Data

US 2019/0098663 A1 Mar. 28, 2019

Related U.S. Application Data

(60) Provisional application No. 62/564,694, filed on Sep. 28, 2017.

(51) Int. Cl.
*H04W 74/08* (2009.01)
*H04W 72/0446* (2023.01)
(Continued)

(52) U.S. Cl.
CPC ... *H04W 74/0808* (2013.01); *H04W 72/0446* (2013.01); *H04W 16/14* (2013.01); *H04W 72/046* (2013.01); *H04W 74/0816* (2013.01)

(58) Field of Classification Search
CPC ......... H04W 72/0446; H04W 74/0808; H04W 74/0816; H04W 72/046; H04W 16/14
See application file for complete search history.

(56) References Cited

U.S. PATENT DOCUMENTS

| 2007/0133457 A1* | 6/2007 | Doi | H04W 74/0816 |
| | | | 370/329 |
| 2009/0233614 A1* | 9/2009 | Sousa | H04W 72/08 |
| | | | 455/450 |

(Continued)

FOREIGN PATENT DOCUMENTS

| CN | 107182127 A | 9/2017 |
| EP | 3125635 A1 | 2/2017 |

(Continued)

OTHER PUBLICATIONS

Lou, et al., U.S. Appl. No. 62/417,063, filed Nov. 3, 2016, whole document (Year: 2016).*

(Continued)

*Primary Examiner* — Michael Thier
*Assistant Examiner* — Jose L Perez
(74) *Attorney, Agent, or Firm* — Haynes and Boone, LLP

(57) ABSTRACT

Wireless communications systems and methods related to considering channel variations for medium sharing in a spatial domain are provided. A first wireless communication device transmits one or more reservation response signals indicating spatial channel information in response to a reservation request for a transmission opportunity (TXOP) in a frequency spectrum. The first wireless communication device receives, from a second wireless communication device, a communication signal from a first spatial subspace during the TXOP based on the reservation request. In one embodiment, the first wireless communication device may repeat a transmission of the reservation response signal after transmitting a portion of the communication signal. In another embodiment, the first wireless communication device may include a channel variation parameter in the reservation response signal.

28 Claims, 10 Drawing Sheets

(51) Int. Cl.
*H04W 72/044* (2023.01)
*H04W 16/14* (2009.01)

(56) References Cited

U.S. PATENT DOCUMENTS

| | | | | |
|---|---|---|---|---|
| 2012/0113952 | A1* | 5/2012 | Kneckt | H04W 72/0406 370/330 |
| 2013/0201840 | A1* | 8/2013 | Sorrentino | H04W 24/08 370/252 |
| 2013/0301543 | A1* | 11/2013 | Eriksson | H04W 72/00 370/329 |
| 2014/0092857 | A1* | 4/2014 | Kneckt | H04W 28/26 370/329 |
| 2014/0093005 | A1* | 4/2014 | Xia | H04B 7/0639 375/267 |
| 2016/0112107 | A1* | 4/2016 | Wang | H04L 1/00 370/329 |
| 2016/0165630 | A1* | 6/2016 | Oteri | H04W 74/04 370/336 |
| 2016/0192396 | A1* | 6/2016 | Ng | H04W 72/1289 370/329 |
| 2016/0233940 | A1 | 8/2016 | Huang et al. | |
| 2016/0255613 | A1* | 9/2016 | Faerber | H04W 16/32 370/330 |
| 2017/0070962 | A1* | 3/2017 | Wang | H04W 52/241 |
| 2017/0215083 | A1* | 7/2017 | Kudo | H04W 76/10 |
| 2017/0231009 | A1* | 8/2017 | Wang | H04W 72/0413 |
| 2017/0280461 | A1* | 9/2017 | Zhang | H04W 72/082 |
| 2018/0084554 | A1* | 3/2018 | Chu | H04L 1/188 |
| 2018/0110057 | A1* | 4/2018 | Park | H04W 74/0808 |
| 2018/0242331 | A1* | 8/2018 | Zhu | H04B 7/0697 |
| 2019/0007973 | A1* | 1/2019 | Lou | H04W 74/0816 |
| 2019/0150196 | A1* | 5/2019 | Koorapaty | H04L 1/1832 370/329 |
| 2019/0182866 | A1* | 6/2019 | Li | H04W 74/0808 |
| 2019/0208463 | A1* | 7/2019 | Lou | H04B 7/0413 |
| 2019/0230703 | A1* | 7/2019 | Lv | H04W 52/246 |
| 2019/0268939 | A1* | 8/2019 | Yang | H04W 74/0808 |
| 2020/0067577 | A1* | 2/2020 | Lou | H04L 27/2601 |

FOREIGN PATENT DOCUMENTS

| | | | | |
|---|---|---|---|---|
| EP | 3139671 | A1 | 3/2017 | |
| EP | 3407659 | A1 * | 11/2018 | ........ H04W 74/0808 |
| WO | WO-2014210401 | A2 * | 12/2014 | |
| WO | WO-2017120418 | A1 | 7/2017 | |
| WO | WO-2017126935 | A1 * | 7/2017 | ........ H04W 74/0808 |
| WO | 2016060822 | A8 | 9/2017 | |
| WO | WO-2018084900 | A1 * | 5/2018 | .......... H04L 1/0025 |
| WO | WO-2018204604 | A1 * | 11/2018 | .......... H04B 7/0695 |

OTHER PUBLICATIONS

Sun et al., U.S. Appl. No. 62/552,744, filed Aug. 31, 2017, whole document (Year: 2017).*
International Search Report and Written Opinion—PCT/US2018/044655—ISA/EPO—dated Oct. 10, 2018.

* cited by examiner

SPATIAL LISTEN-BEFORE-TALK (LBT) WITH CHANNEL VARIATION CONSIDERATION

CROSS REFERENCE TO RELATED APPLICATIONS

The present application claims priority to and the benefit of the U.S. Provisional Patent Application No. 62/564,694, filed Sep. 28, 2017, which is hereby incorporated by reference in its entirety as if fully set forth below and for all applicable purposes.

TECHNICAL FIELD

This application relates to wireless communication systems, and more particularly to improving medium sharing by considering spatial channel variations.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

One approach to avoiding collisions when communicating in a shared medium or a shared channel is to use a listen-before-talk (LBT) procedure to ensure that the shared channel is clear before transmitting a signal in the shared channel. To increase medium utilization efficiency, medium sharing can include a spatial dimension in addition to the time and/or frequency sharing. For example, a reservation for a transmission opportunity (TXOP) in a LBT procedure may indicate a reserved spatial dimension (e.g., one or more spatial layers or spatial directions) to be used during the TXOP. Thus, other nodes may share the medium in a spatial domain (e.g., using unreserved spatial layers or unreserved spatial directions). However, channel characteristics or interference may vary over time, for example, due to Doppler effects. Thus, the reserved spatial dimension may vary over the duration of the TXOP.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a first wireless communication device, one or more reservation response signals indicating spatial channel information in response to a reservation request for a transmission opportunity (TXOP) in a frequency spectrum, the spatial channel information may be the same or different among the one or more reservation response signals; and receiving, by the first wireless communication device from a second wireless communication device, a communication signal from a first spatial subspace during the TXOP based on the reservation request.

In an additional aspect of the disclosure, a method of wireless communication includes receiving, by a first wireless communication device from a second wireless communication device, one or more reservation response signals indicating spatial channel variation information related to a reservation request for a transmission opportunity (TXOP) in a frequency spectrum; and transmitting, by the first wireless communication device to a third wireless communication device, a communication signal during the TXOP in a first spatial subspace based on the received one or more reservation response signals.

In an additional aspect of the disclosure, an apparatus includes a transceiver configured to transmit one or more reservation response signals indicating spatial channel variation information in response to a reservation request for a transmission opportunity (TXOP) in a frequency spectrum; and receive, from a second wireless communication device, a communication signal from a first spatial subspace during the TXOP based on the reservation request.

In an additional aspect of the disclosure, an apparatus includes a transceiver configured to receive, from a second wireless communication device, one or more reservation response signals indicating spatial channel variation information related to a reservation request for a transmission opportunity (TXOP) in a frequency spectrum; and transmit, to a third wireless communication device, a communication signal during the TXOP in a first spatial subspace based on the received one or more reservation response signals.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
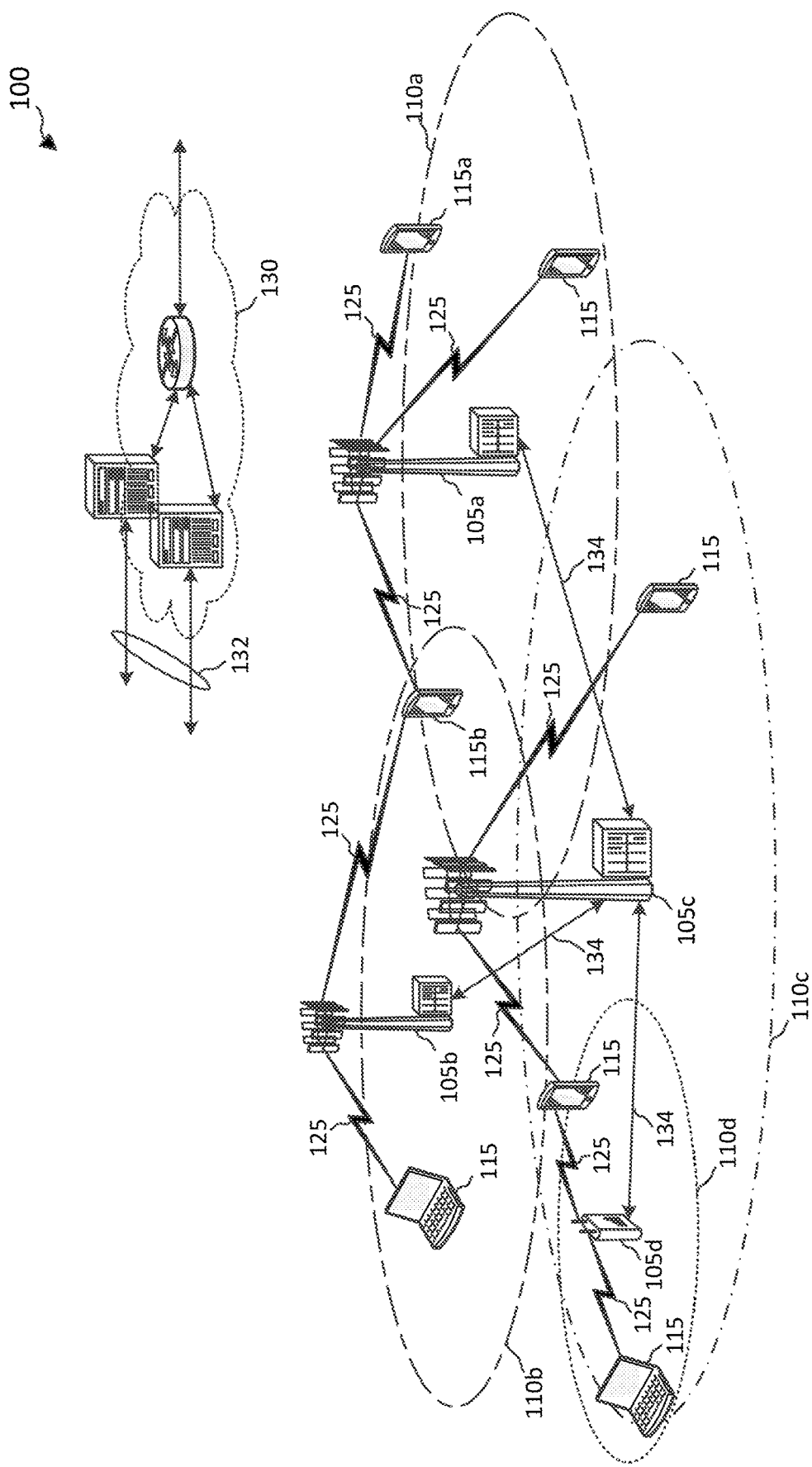
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes mechanisms for medium sharing that utilizes spatial channel variations when overlaying a transmission over an ongoing transmission in a spatial domain. For example, a first transmitter-receiver pair may gain access to a transmission opportunity (TXOP) in a shared channel or communication medium and may be in communication during the TXOP. The communication of the first transmitter-receiver pair may be referred to as an ongoing transmission. The ongoing transmission may use a particular spatial subspace in the spatial domain. For spatial sharing, a second transmitter-receiver pair may communicate in the same channel at the same time as the ongoing transmission, but in a different spatial subspace than the spatial subspace used by the ongoing transmission. The communication of the second transmitter-receiver pair may be referred to as an overlaid transmission, which overlays on top of the ongoing transmission in a spatial domain.

In an embodiment, a victim receiver (e.g., the receiver of the first pair) may transmit multiple reservation response signals within the duration of a TXOP to enable an aggressor (e.g., the transmitter of the second pair) to update the spatial subspace of an overlaid transmission one or more times during the duration of the overlaid transmission.

In an embodiment, a victim receiver may transmit a single reservation response signal for a TXOP, but may include spatial channel variation information in the reservation response signal. An aggressor may transmit an overlaid transmission at decreasing transmission power levels based on the received channel variation information. An aggressor may also transmit at a beginning portion of the TXOP and refrain from transmitting at a later portion of the TXOP based on the received channel variation information or a channel variation detected by the aggressor.

In some embodiments, when a victim receiver detects a high channel variation (e.g., high Doppler), the victim receiver may transmit a reservation response signal using a larger spatial subspace (e.g., a wider spatial dimension) than a spatial subspace to be used for receiving a communication signal in a TXOP. In some embodiments, a victim receiver may transmit a reservation response signal indicating that spatial sharing is disallowed, for example, based on a Doppler speed, a transmit-receive antenna ratio, and/or a channel phase response. The disclosed embodiments may be suitable for use in any wireless network that operates over a shared channel. The disclosed embodiments may use the terms spatial subspace, spatial dimension, spatial direction, and spatial layers interchangeably to refer to a physical direction of a transmission beam or a reception beam in a spatial domain.

Aspects of the present disclosure can provide several benefits. For example, the repeating reservation response signal transmissions within a duration of a TXOP can allow an aggressor to detect a spatial channel variation and update a spatial subspace for an overlaid transmission based on detected channel variation. In addition, the repeating reservation response signal transmissions can allow an aggressor that missed a detection of an earlier reservation response signal to detect the presence of the ongoing transmission. The indication of the spatial channel variation information in the reservation response signal can allow an aggressor to determine transmission power levels for an overlaid transmission to minimize interference to a victim receiver. The indication can eliminate the overheads of the repeating reservation response signal transmissions and/or the transmit-receive switching. Thus, the disclosed embodiments can improve spatial sharing performance and/or efficiency.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may operate over a shared channel, which may include a licensed spectrum, a shared spectrum, and/or an unlicensed spectrum, and may support dynamic medium sharing. The BSs 105 and the UEs 115 may be operated by multiple network operating entities sharing resources in the shared channel. A BS 105 or a UE 115 may reserve a transmission opportunity (TXOP) in the shared channel by transmitting a reservation request signal prior to transmitting data in the TXOP. A corresponding receiver (e.g., a BS 105 or a UE 115) may respond by transmitting a reservation response signal. To avoid collisions, other BSs 105 and/or other UEs 115 may listen to the channel and refrain from accessing the channel during the TXOP upon detection of the reservation request signal and/or the reservation response signal. For example, a node intending to transmit in the shared channel may start a countdown process using a random counter. When the countdown is completed, the node may deem the shared channel is not occupied and may begin its transmission.

In an embodiment, the network 100 may perform medium sharing over a spatial domain to further increase medium or channel utilization efficiency. For example, the BSs 105 and/or the UEs 115 may be equipped with multiple antennas (e.g., antenna arrays) and form beams in particular spatial directions for signal transmissions and receptions. To enable spatial sharing, a reserving node (e.g., a BS 105 or a UE 115) may indicate spatial layer or spatial dimension information in a reservation for a TXOP. Other nodes may listen to the reservation and may use remaining spatial layers, dimensions, or directions during the TXOP. In other words, nodes in the network 100 may perform spatial LBT and overlay a transmission on top of an ongoing transmission in a spatial domain. Since channel characteristics may vary over time, for example, due to Doppler or other interference, the initial spatial reservation information may vary over the duration of the TXOP. In addition, some nodes may miss the detection of earlier reservation responses, and hence may not be able to determine an appropriate spatial subspace for transmission and may cause interference to the reserving node. To improve spatial sharing performance, the spatial LBT procedure may consider spatial channel variations or node missing reservation responses when determining whether to overlay a transmission spatially over an ongoing transmission or when determining a spatial dimension for the overlaid transmission. Mechanisms for considering spatial channel variations and/or miss detections of reservation response in medium sharing are described in greater detail herein.

Figure 2:
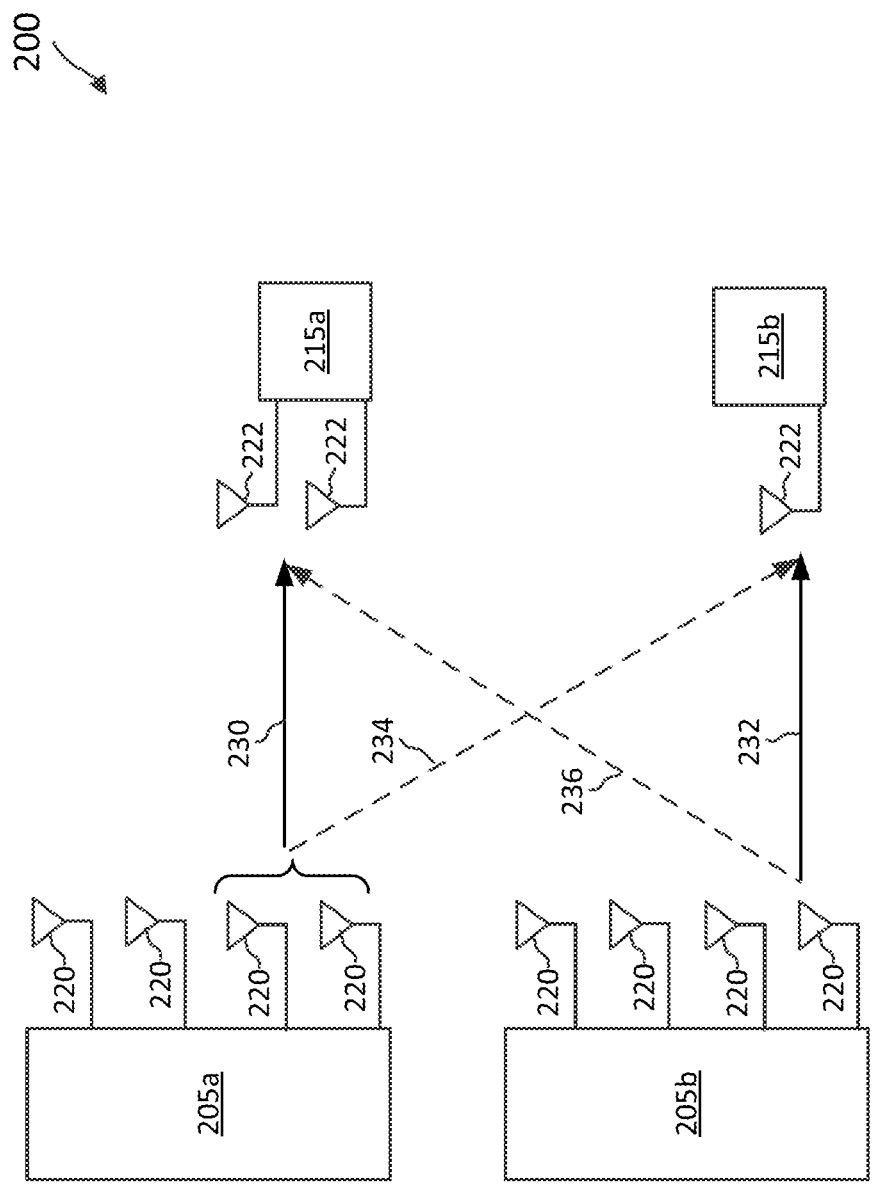
FIG. 2 illustrates a wireless communication network that implements medium sharing in a spatial domain according to embodiments of the present disclosure.

FIG. 2 illustrates a wireless communication network 200 that implements medium sharing in a spatial domain according to embodiments of the present disclosure. The network 200 corresponds to a portion of the network 100. FIG. 2 illustrates two BSs 205 and two UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The network 200 may be operated by multiple operators sharing a frequency spectrum. For example, Operator A may operate the BS 205a and the UE 215a, and Operator B may operate the BS 205b and the UE 215b. In addition, FIG. 2 illustrates each BS 205 including four transmit antennas 220, the UE 215a including two receive antennas 222, and the UE 215b including one receive antenna 222 for purposes of simplicity of discussion, though it will be recognized that embodiments of the present disclosure may scale to any suitable number of transmit antennas and/or receive antennas at the BSs 205 and/or the UEs 215. For example, a BS 205 or a UE 215 may include an antenna array including between 1 and 64 antennas.

The BS 205a having four transmit antennas 220 can support up to a transmission rank of four or four spatial layers. The BS 205a may employ single-input single-output (SISO), single-input multiple-output (SIMO), multiple-input single-output (MISO), or multiple-input multiple-output (MIMO) type pre-coding techniques to communicate with the UE 215a over a number of the spatial layers. The BS 205a may communicate with the UE 215a using a subset or all of the transmit antennas 220. For example, the BS 205a may communicate with the UE 215a using two antennas 220 as shown by the link 230, which may be referred to as a 2×2 link.

Similarly the BS 205b having four transmit antennas 220 can support up to a transmission rank of four or four spatial layers. Since the UE 215b includes one antenna 222, the BS may communicate with the UE 215b using one transmit antenna 220 to form 1×1 link (e.g., single-input single-output (SISO)) or using two transmit antennas to form a 2×1 link (e.g., a MISO).

As an example, the BS 205 and the UE 215 operate over a shared channel and both the BS 205a and the BS 205b have data to transmit to the UE 215a and the UE 215b, respectively. Both the BS 205a and the BS 205b may start a countdown process before transmissions. For example, the BS 205b completes the countdown process before the BS 205a, and thus may gain access to the shared channel and reserve the shared channel for a TXOP. For example, the BS 205b communicates with the UE 215b over one spatial layer as shown by the link 232 during the TXOP. The BS 205a may be physically positioned close to the UE 215b and may detect the ongoing transmission from the BS 205b to the UE 215b.

When employing medium sharing over time and frequency only, the BS 205a may refrain from communicating with the UE 215a to avoid causing interference to the reception at the UE 215b (e.g., over the cross link 234). However, when the BS 205a performs spatial LBT, the BS 205a may detect that the BS 205b communicates with the UE 215b over a single spatial layer or a particular spatial direction. Thus, the BS 205a may communicate with the UE 215a using remaining spatial layers or dimensions unused by the BS 205b. For example, the BS 205a may use two transmit antennas 220 to communicate with the UE 215a over the link 230 as shown. The BS 205a may perform beamforming to direct the transmission to a different spatial direction than the ongoing transmission between the BS 205b and the UE 215b. Thus, the BS 205a (e.g., the aggressor) may cause a minimal interference to the UE 215b (e.g., the victim receiver) over the cross link 234 and the BS 205b may cause a minimal interference to the UE 215a over the cross link 236.

However, channel conditions may vary over time. For example, a channel may experience a Doppler interference, causing the channel to vary rapidly. For example, the channel response of the cross link 234 may vary substantially over the duration of the TXOP. The variation at the cross link 234 may be caused by channel changes at the UE 215b (e.g., the victim receiver) and/or the BS 205a (e.g., the aggressor). The performance of the spatial sharing may be sensitive to the channel variation in the cross link 234. When the channel in the cross link 234 varies, the spatial direction or dimension determined by the BS 205a at the beginning of the TXOP based on the cross link 234 may be outdated and may cause non-negligible interference to the UE 215b, for example, during a later portion of the TXOP. In addition, some nodes may miss the detection of earlier reservation responses, and hence may not be able to determine an appropriate spatial subspace and may cause interference to the reserving node. To improve medium sharing performance, the victim receiver (e.g., the UE 215b) may provide spatial channel variation information to the aggressor or send multiple reservation response so that the aggressor (e.g., the BS 205a) may update its transmission based on the spatial channel variation information or obtain the proper spatial subspace with multiple reservation signal, as described in greater detail herein.

Figure 3:
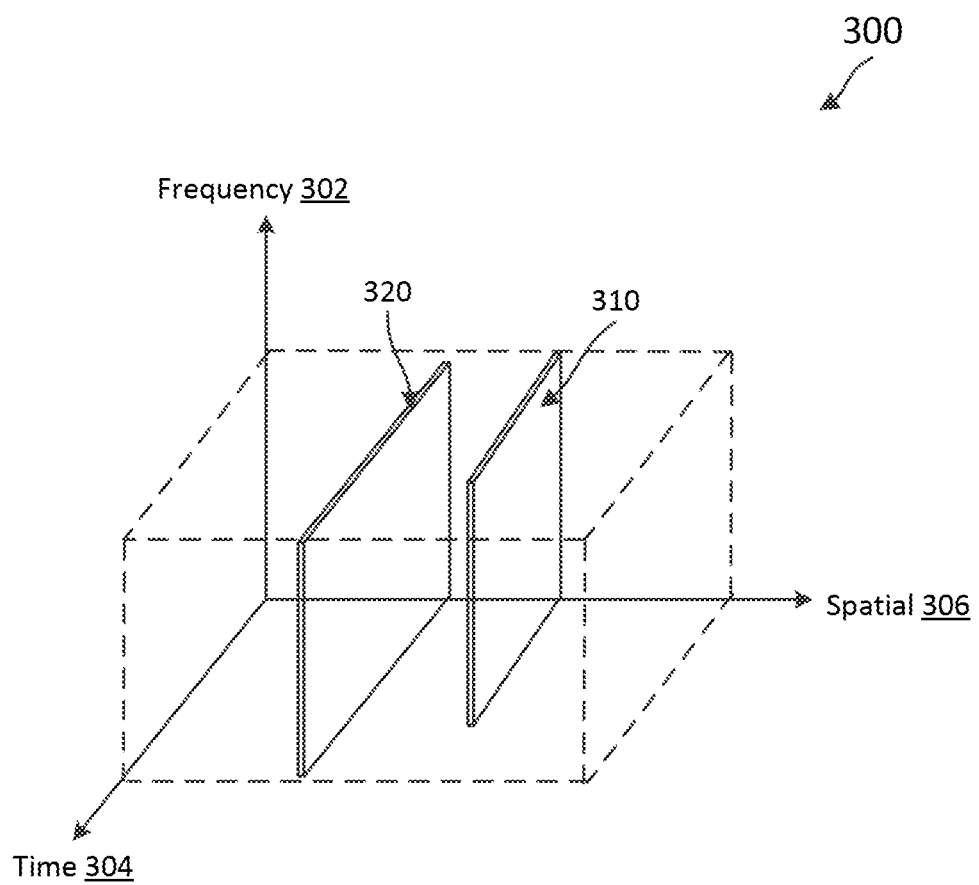
FIG. 3 illustrates a medium sharing scheme according to embodiments of the present disclosure.

FIG. 3 illustrates a medium sharing scheme 300 according to embodiments of the present disclosure. The scheme 300 may be employed by the BSs 105 and 205 and the UEs 115 and 215. The scheme 300 illustrates medium sharing in a spatial domain. For example, in addition to a frequency dimension 302 and a time dimension 304, the scheme 300 includes a spatial dimension 306. FIG. 3 illustrates two spatial channels 310 and 320 for purposes of simplicity of discussion, though it will be recognized that embodiments of the present disclosure may scale to many more spatial channels 310 and 320 and the spatial channels may span in any suitable manner in the frequency dimension 302, the time dimension 304, and the spatial dimension 306. As shown, the spatial channels 310 and 320 have different spatial dimensions (e.g., occupying different spaces in the spatial dimension 306). Thus, cross-channel interference between the spatial channels 310 and 320 may be minimal or zero. For example, the spatial channels 310 and 320 may correspond to the channels over the links 230 and 232, respectively. The spatial channels 310 and 320 may be referred to as spatial subspaces.

Figure 4:
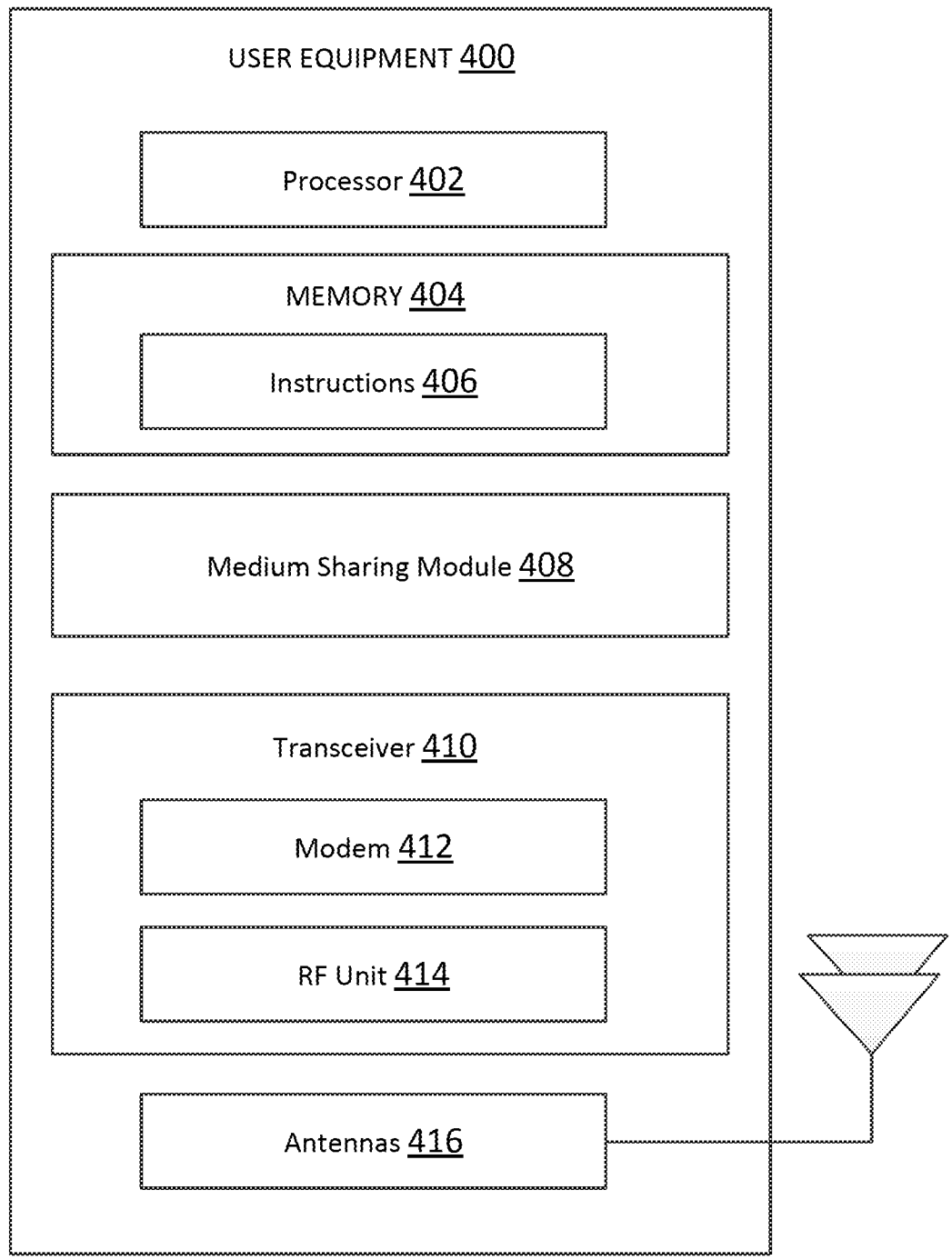
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 or 215 as discussed above. As shown, the UE 400 may include a processor 402, a memory 404, a medium sharing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 215 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The medium sharing module 408 may be implemented via hardware, software, or combinations thereof. For example, the medium sharing module 408 may be implemented as a processor, circuit, and/or instructions 406 stored in the memory 404 and executed by the processor 402. The medium sharing module 408 may be used for various aspects of the present disclosure. For example, the medium sharing module 408 is configured to perform spatial LBT, transmit reservation request signals and reservation response signals, indicate spatial channel variation information (e.g., via repeated reservation response signal transmissions or channel variation parameters), detect spatial channel variations, perform spatial channel estimation, perform spatial sharing, and/or update spatial sharing based on detected spatial channel variations, as described in greater detail herein.

As shown, the transceiver 410 may include the modem subsystem 412 and the RF unit 414. The transceiver 410 can be configured to communicate bi-directionally with other devices, such as the BSs 105 and 205. The modem subsystem 412 may be configured to modulate and/or encode the data from the memory 404 and/or the medium sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 215 or a BS 205. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 215 to enable the UE 215 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may be similar to the antennas 220 and 222. This may include, for example, transmission of reservation signals, reservation response signals, and/or any communication signal according to embodiments of the present disclosure. The antennas 416 may further receive data messages transmitted from other devices. This may include, for example, reception of request-to-send (RTS) and/or CTS signals according to embodiments of the present disclosure. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
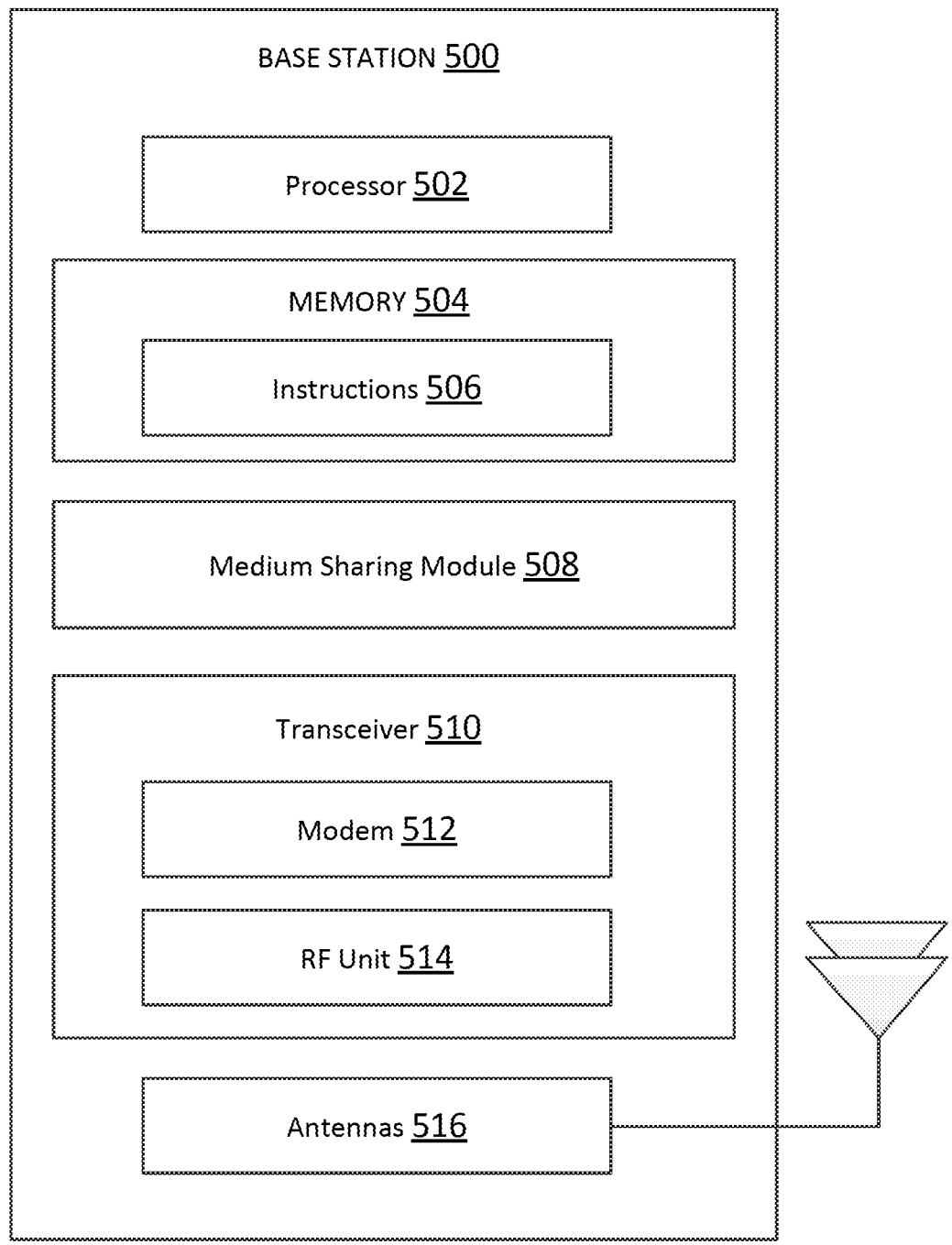
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 or 205 as discussed above. A shown, the BS 500 may include a processor 502, a memory 504, a medium sharing module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The medium sharing module 508 may be implemented via hardware, software, or combinations thereof. For example, the medium sharing module 508 may be implemented as a processor, circuit, and/or instructions 506 stored in the memory 404 and executed by the processor 502. The medium sharing module 508 may be used for various aspects of the present disclosure. For example, the medium sharing module 508 is configured to perform spatial LBT, transmit reservation signals and reservation response signals, indicate spatial channel variation information (e.g., via repeated reservation response signal transmissions or channel variation parameters), detect spatial channel variations, perform spatial channel estimation, perform spatial sharing, and/or update spatial sharing based on detected spatial channel variations, as described in greater detail herein.

As shown, the transceiver 510 may include the modem subsystem 512 and the RF unit 514. The transceiver 510 can be configured to communicate bi-directionally with other devices, such as the UEs 115 and 215 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 205 to enable the BS 205 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may be similar to the antennas 220 and 222. This may include, for example, transmission of information to complete attachment to a network and communication with a camped UE 215 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
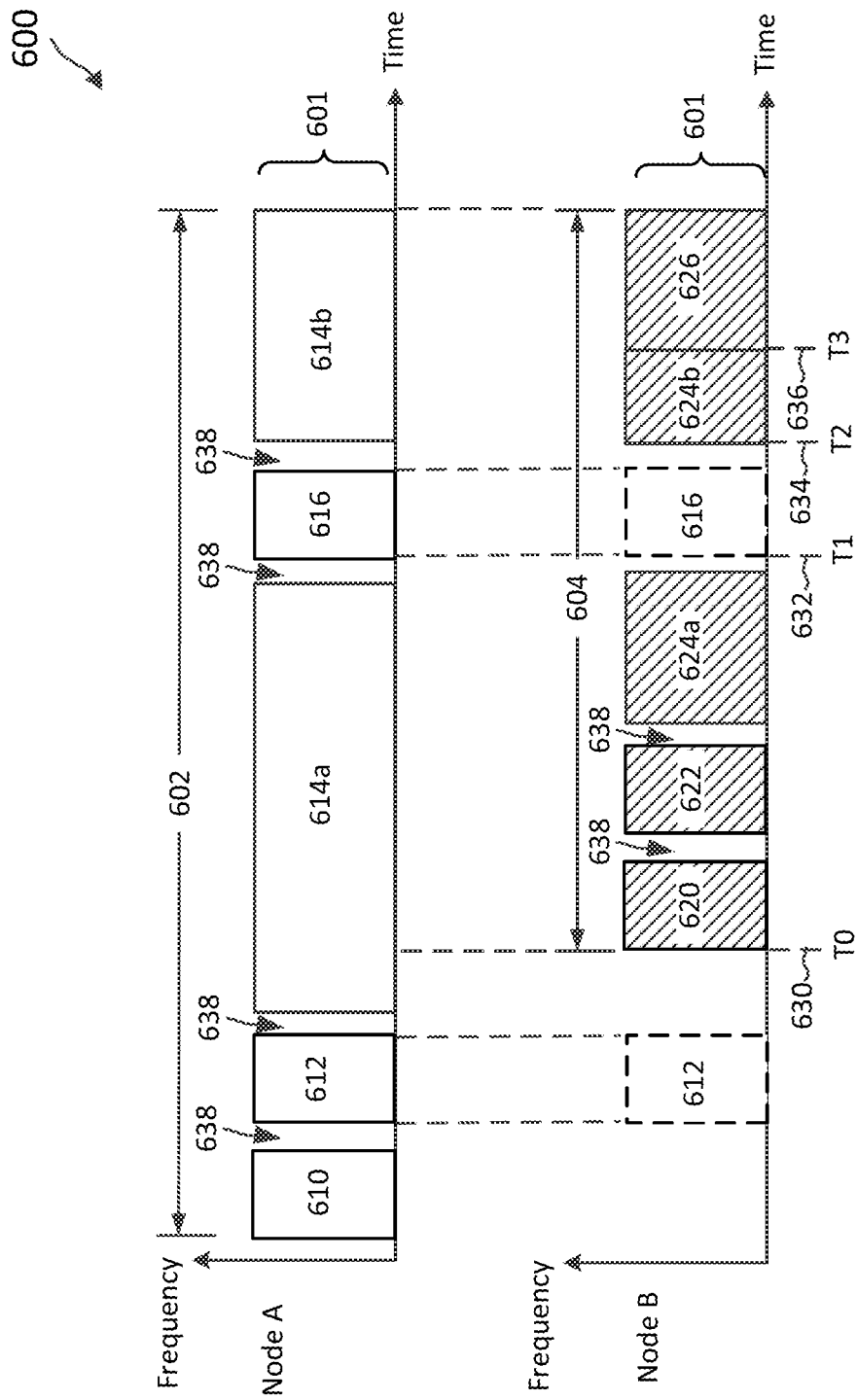
FIG. 6 illustrates a medium sharing scheme that considers spatial channel variations according to embodiments of the present disclosure.
Figure 7:
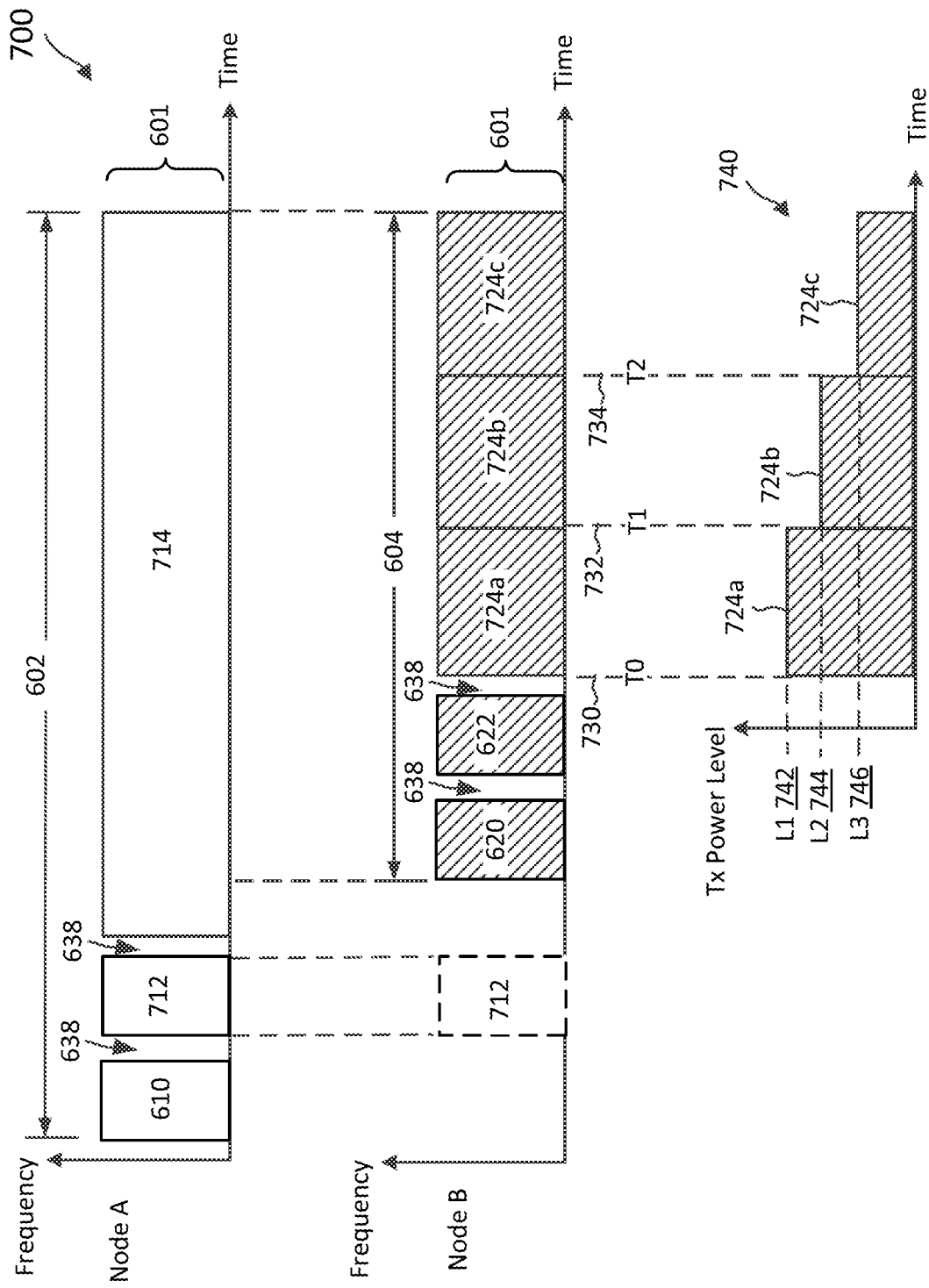
FIG. 7 illustrates a medium sharing scheme that considers spatial channel variations according to embodiments of the present disclosure.
Figure 8:
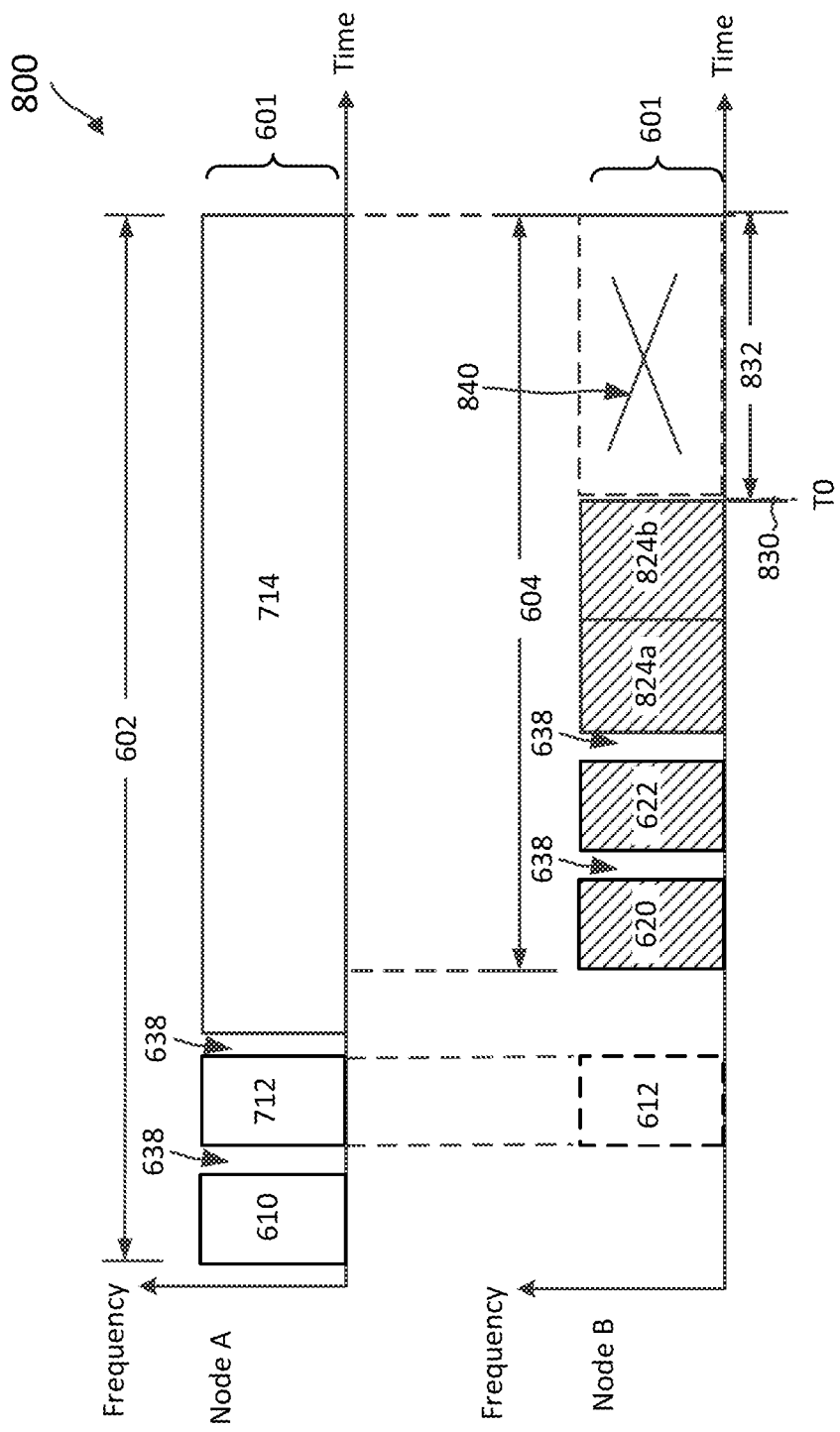
FIG. 8 illustrates a medium sharing scheme that considers spatial channel variations according to embodiments of the present disclosure.

FIGS. 6-8 illustrate various mechanisms for a victim receiver (e.g., the UE 215b) to indicate a spatial channel variation in an ongoing transmission and for an aggressor (e.g., the BS 205*a*) to update a spatial subspace for an overlaid transmission based on a spatial channel variation. In FIGS. 6-8, the x-axes represent time in some constant units. The y-axes represent frequency in some constant units. The empty-filled boxes represent communications between a victim receiver (e.g., the UE 215*b*) and a corresponding transmitter (e.g., the BS 205*a*). The pattern-filled boxes represent communications between an aggressor (e.g., the BS 205*a*) and a corresponding receiving node (e.g., the UE 215*a*). The dashed-outlined boxes represent detections by the aggressor.

FIG. 6 illustrates a medium sharing scheme 600 that considers spatial channel variations according to embodiments of the present disclosure. The scheme 600 may be employed by the BSs 105, 205, and 500 and the UEs 115, 215, and 400. The scheme 600 illustrates a victim receiver transmitting a repeated reservation response signal during a TXOP to allow an aggressor to update a spatial subspace (e.g., the spatial channels 310 and 320) for overlaying a transmission over an ongoing transmission destined to the victim receiver. In addition, the transmission of the repeated reservation response signal during the TXOP can allow an aggressor to determine a spatial subspace when the aggressor misses a previous reservation response signal. In the scheme 600, the node A corresponds to a victim receiver receiving data from a transmitting node in a frequency spectrum 601 and the node B corresponds to an aggressor located close to the node A and transmitting data to a receiving node in the frequency spectrum 601. For example, the transmitting node, the node A, the node B, and the receiving node may correspond to the BS 205*b*, the UE 215*b*, the BS 205*a*, and the UE 215*a*, respectively, in the network 200. The transmitting node and the receiving node are not shown for purposes of simplicity of illustration.

As shown, the node A receives a reservation request signal 610 from the transmitting node reserving a TXOP 602 in the frequency spectrum 601 for communication with the node A. The reservation request signal 610 may be a request-to-send (RTS) signal. The reservation request signal 610 may include a predetermined signal sequence and/or scheduling information. The scheduling information may include a spatial subspace (e.g., number of spatial layers or a spatial dimension) requested for the communication. The node A responds by transmitting a reservation response signal 612. The reservation response signal 612 may be a clear-to-send (CTS) signal. The node A may transmit the reservation response signal 612 in the spatial subspace to be used for the communication. Subsequently, the node A receives a data signal 614 from the transmitting node.

The node B may detect the reservation response signal 612. The node B may determine a spatial subspace used by the reservation response signal 612 based on a reception of the reservation response signal 612 and determine that there are remaining spatial dimensions unoccupied. Thus, the node B may use any of the remaining dimensions to communicate with the receiving node. The node B may determine a spatial subspace (e.g., the spatial channel 310) having a different spatial dimension than the spatial subspace (e.g., the spatial channel 320) of the reservation response signal 612 to avoid causing an interference to the node A over a cross link (e.g., the cross link 234) when the node B communicates with the receiving node.

At time 630, shown as T0, the node B transmits a reservation request signal 620 reserving a period 604 within a duration of the TXOP 602. The node B receives a reservation response signal 622 from the receiving node. The reservation request signal 620 and the reservation response signal 622 may be substantially similar to the reservation request signal 610 and the reservation response signal 612, respectively, but may be communicated in different spatial subspaces and/or carry different spatial information. After receiving the reservation response signal 622, the node A transmits a data signal 624 (shown as 624*a*) to the receiving node using the determined spatial subspace.

At time 632, shown as T1, after transmitting at least a portion of the data signal 614 (shown as 614*a*), the node A transmits another reservation response signal 616. After transmitting the reservation response signal 616, the node A continues to complete transmission of the data signal 614 (shown as 614*b*). In some embodiments, the data signal 614*b* may be a different signal instead of a remaining portion of the data signal 614*a*. The reservation response signal 616 may be substantially similar to the reservation response signal 612. However, the reservation response signal 616 may indicate a different spatial subspace than the reservation response signal 612 due to a spatial channel variation. The node B may listen to the channel and may detect the reservation response signal 616. The node B may determine an updated spatial subspace based on the reservation response signal 616. In addition, if the node B misses the reservation response signal 612, the node B may determine the spatial subspace based on the reservation response signal 616.

At time 632, shown as T2, the node B completes the transmission of the data signal 624 (shown as 624*b*) using the initial determined spatial subspace. At time 636, shown as T3, the node B transmits a data signal 626 in the updated spatial subspace. As such, while the spatial channel over the cross link may vary, the node B may continue to avoid causing a significant interference to the node A during the TXOP 602 of the node A. In some embodiments, the data signal 626 may be a remaining portion of the data signal 624.

In the scheme 600, a time gap 638 is present when there is a transmit-to-receive or a receive-to transmit switching. The time gaps 638 allow time for a node to switch between receiving and transmitting.

In an embodiment, the time (e.g., the time 632) at which the node A transmits the repeated reservation response signal 616 may be semi-statically configured (e.g., a predetermined schedule). For example, the node A may switch from receiving the data signal 614 to transmitting the reservation response signal 616 based on the predetermined schedule. Similarly, the node B may switch from transmitting the data signal 624 to listening for the reservation response signal 616 based on the predetermined schedule.

In another embodiment, each reservation response signal may indicate a transmission time (e.g., the time 632) for a next reservation response signal.

In some embodiments, a victim receiver may transmit multiple repeated reservation response signals within the duration of a TXOP. In addition to allowing an aggressor to update spatial subspace information, the repeated reservation response signals may enable an aggressor that missed the detection of a previous reservation response signal of an ongoing transmission to detect the presence of the ongoing transmission. Thus, the scheme 600 can improve spatial sharing performance. However, the scheme 600 may increase the amount of overhead due to the additional reservation response signal communications (e.g., the reservation response signal 616) within the TXOP 602 the multiple transmit-receive switching within the TXOP 602.

FIG. 7 illustrates a medium sharing scheme 700 that considers spatial channel variations according to embodiments of the present disclosure. The scheme 700 may be employed by the BSs 105, 205, and 500 and the UEs 115, 215, and 400. The scheme 700 may be substantially similar to the scheme 600, where the node A representing a victim receiver may communicate with a corresponding transmitting node and the node B representing an aggressor may communicate with a corresponding receiving node. However, in the scheme 700, a victim receiver may indicate channel variation parameters in a reservation response signal instead of repeating reservation response signal transmissions during a TXOP as in the scheme 600.

In the scheme 700, the node A transmits a reservation response signal 712 in response to a reservation request signal 610 reserving a TXOP 602. The reservation response signal 712 may be transmitted in a spatial subspace to be used for communication during the TXOP 602 and additionally indicate a channel variation parameter. For example, the channel variation parameter may include a Doppler speed or a channel time-based sensitivity level (e.g., indicating a highly varying channel or a slowly varying channel). Subsequently the node A receives a data signal 714 from the transmitting node during the TXOP 602.

The node B may listen to the channel before transmitting in the frequency spectrum 601. The node B may detect the reservation response signal 712. The node B may determine a spatial subspace having a different spatial dimension than the spatial subspace of the reservation response signal 712. The node B transmits a reservation request signal 620 to reserve a period 604 within the TXOP 602. The node B receives a reservation response signal 622. The node B may determine a spatial subspace and transmission power levels for transmissions in the period 604 based on the reception of the reservation response signal 712 and the channel variation parameter indicated by the node A.

To avoid causing interference at the node A, the node B may transmit data signals 724a, 724b, and 724c (e.g., the overlaid transmission) at a decreasing transmit power level in the period 604 as shown in the graph 740 without changing the spatial subspace for the transmissions. In the graph 740, the x-axis represents time in some constant units and the y-axis represents transmit (Tx) power level in some constant units. As shown, at a time 730, shown as T0, the node B may transmit the data signal 724a at a transmit power level 742. At a time 732, shown as T1, the node B may transmit the data signal 724b at a reduced transmit power level 744. At a time 732, shown as T2, the node B may transmit the data signal 724c at a further reduced transmit power level 746. The node B may determine the transmit power levels 742, 744, and 746 based on the reception power of the reservation response signal 712 and the channel variation parameter. In some embodiments, the period 604 may be divided into transmission slots and the time 730, 732, and 734 may correspond to the beginning of a transmission slot.

In some embodiments, when the node A experience a high channel variation (e.g., a high Doppler speed), the node A may transmit the reservation response signal 712 using a wider spatial dimension to reserve a larger spatial subspace than a spatial subspace to be used for receiving the data signal 714. In an embodiment, the node A may transmit the reservation response signal 712 using an omnidirectional beam to disable spatial sharing by another node.

In some embodiments, the node A may indicate in the reservation response signal 712 that spatial sharing is disallowed, for example, based on a determination of a high Doppler, a channel phase discontinuity, or a transmit-to-receive antenna ratio (e.g., when the number of transmit antenna is less than the number receive antenna).

FIG. 8 illustrates a medium sharing scheme 800 that considers spatial channel variations according to embodiments of the present disclosure. The scheme 800 may be employed by the BSs 105, 205, and 500 and the UEs 115, 215, and 400. The scheme 800 may be substantially similar to the scheme 700, but illustrate a scenario where an aggressor experiences a high channel variation (e.g., a high Doppler). Similar to the scheme 700, the node B may determine a spatial subspace for transmissions in a period 604 within the TXOP 602 based on the reception of the reservation response signal 712 and the channel variation parameter indicated by the node A. However, the node B may experience a high channel variation.

To avoid causing interference to the node A, the node B may transmit one or more data signals 824 using the same determined spatial subspace, but may only transmit during a beginning portion (e.g., in one or more initial transmission slots) of the period 604. As shown, the node B completes the transmissions of the data signal 824 at a time 830, shown as T0, and refrains from transmitting in the frequency spectrum 601 during a remaining portion 832 of the period 604 as shown by the cross 840.

Figure 9:
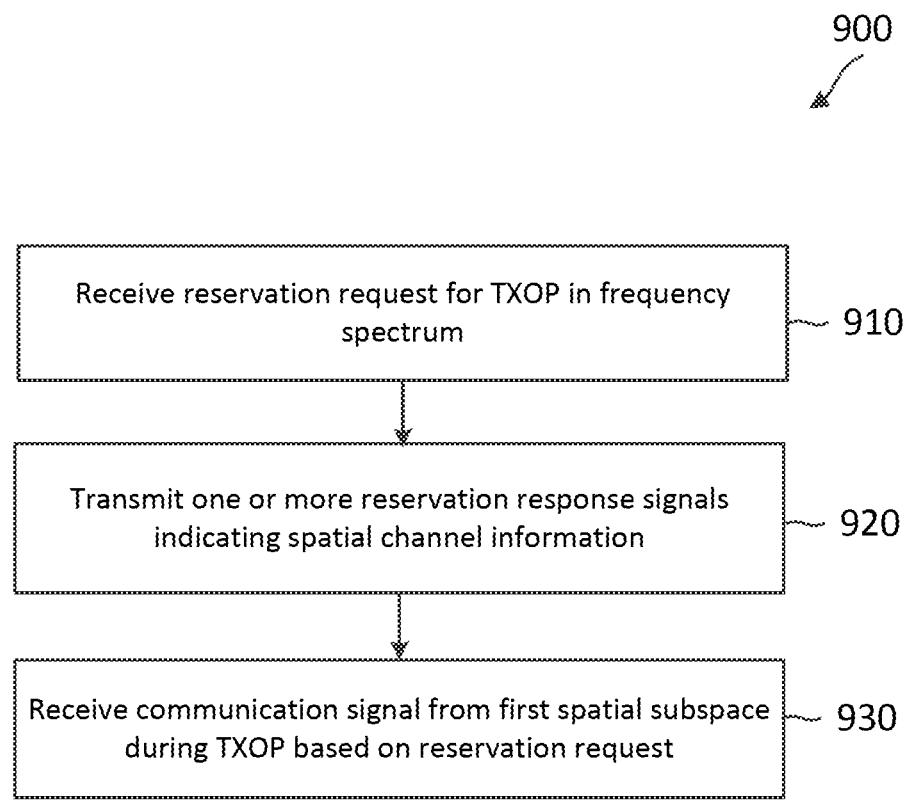
FIG. 9 is a flow diagram of a medium sharing method that considers spatial channel variations according to embodiments of the present disclosure.

FIG. 9 is a flow diagram of a medium sharing method 900 that considers spatial channel variations according to embodiments of the present disclosure. Steps of the method 900 can be executed by a computing device (e.g., a processor, processing circuit, and/or other suitable component) of a wireless communication device, such as the BSs 105, 205, and 500 and the UEs 115, 215, and 400. The method 900 may employ similar mechanisms as in the schemes 600, 700, and 800 described with respect to FIGS. 6, 7, and 8, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes receiving a reservation request (e.g., the reservation request signal 610) reserving a TXOP (e.g., the TXOP 602) in a frequency spectrum (e.g., the frequency spectrum 601). The reservation request may be received from a transmitting node intending to communicate with the wireless communication device (e.g., the node A).

At step 920, the method 900 includes transmitting one or more reservation response signals (e.g., the reservation response signals 612, 616, and 712) indicating spatial channel information in response to the reservation request.

At step 930, the method 900 includes receiving a communication signal (e.g., the data signals 614 and 714) from a first spatial subspace (e.g., the spatial channels 310 and 320) during the TXOP based on the reservation request.

In an embodiment, the wireless communication device may indicate the spatial channel information by transmitting a repeated reservation response signal within a duration of the TXOP as shown in the scheme 600. For example, the wireless communication device can transmit a first reservation response signal (e.g., the reservation response signal 612) in a second spatial subspace before receiving the communication signal and transmit a second reservation response signal in a third spatial subspace (e.g., the reservation response signal 616) after receiving at least a portion of the communication signal. The second spatial subspace and the third spatial subspace can include the same spatial dimension or different spatial dimensions. In some embodiments, the first reservation response signal includes transmission timing information (e.g., the time 632) associated with the second reservation response signal. In some embodiments, the transmission time of the second reservation response signal may be predetermined.

In an embodiment, the wireless communication device may indicate the spatial channel information by transmitting a reservation response signal (e.g., the reservation response signal 712) indicating a channel variation parameter (e.g., associated with a Doppler speed) as shown in the schemes 700 and 800.

In some embodiments, when the wireless communication device experiences a high Doppler (e.g., exceeding a threshold), the wireless communication device may transmit a reservation response signal in a spatial subspace including a wider spatial dimension (e.g., in an omnidirection) than the first spatial subspace used for receiving the communication signal.

In some embodiments, the wireless communication device may transmit a reservation response signal indicating that spatial sharing is disallowed in the TXOP based on at least one of a Doppler speed, a channel reciprocity, a transmit-receive antenna ratio, or a channel phase response.

Figure 10:
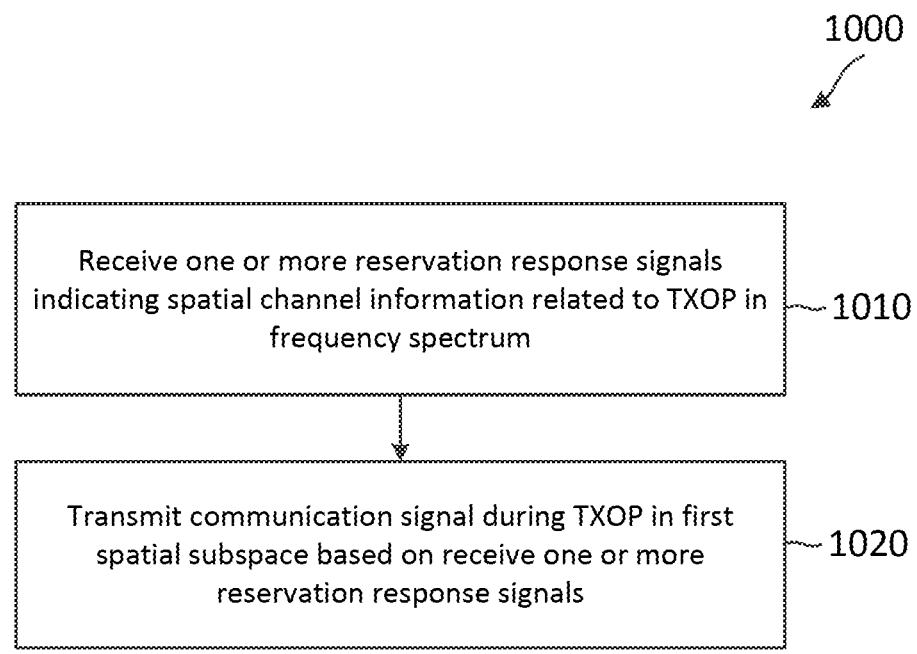
FIG. 10 is a flow diagram of a medium sharing method that considers spatial channel variations according to embodiments of the present disclosure.

FIG. 10 is a flow diagram of a medium sharing method 1000 that considers spatial channel variations according to embodiments of the present disclosure. Steps of the method 1000 can be executed by a computing device (e.g., a processor, processing circuit, and/or other suitable component) of a wireless communication device, such as the BSs 105, 205, and 500 and the UEs 115, 215, and 400. The method 1000 may employ similar mechanisms as in the schemes 600, 700, and 800 described with respect to FIGS. 6, 7, and 8, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes receiving one or more reservation response signals (e.g., the reservation response signals 612, 616, and 712) indicating spatial channel information related to a TXOP (e.g., the TXOP 602) in a frequency spectrum (e.g., the frequency spectrum 601). For example, the one or more reservation response signals may be received from a receiver (e.g., the node A) of an ongoing transmission (e.g., in the TXOP 602).

At step 1020, the method 1000 includes transmitting a communication signal (e.g., the data signals 624, 626, 724, and 824) during the TXOP in a first spatial subspace (e.g., the spatial channels 310 and 320) based on the received one or more reservation response signals. The communication signal corresponds to an overlaid transmission on top of the ongoing transmission. The wireless communication device may determine the first spatial subspace based on a spatial subspace used by the one or more reservation response signals.

In an embodiment, the wireless communication device may receive a repeated reservation response signal within a duration of the TXOP as shown in the scheme 600. For example, the wireless communication device can receive a first reservation response signal (e.g., the reservation response signal 612) in a second spatial subspace before transmitting the communication signal and receive a second reservation response signal in a third spatial subspace (e.g., the reservation response signal 616) after transmitting at least a portion of the communication signal. The second spatial subspace and the third spatial subspace can include the same spatial dimension or different spatial dimensions. The wireless communication device may determine an updated spatial subspace based on the third spatial subspace of the second reservation response signal. The wireless communication device may transmit a second communication signal in a fourth spatial subspace during the TXOP in the updated spatial subspace.

In some embodiments, the first reservation response signal includes transmission timing information (e.g., the time 632) associated with the second reservation response signal. In some embodiments, the transmission time of the second reservation response signal may be predetermined.

In an embodiment, the wireless communication device may indicate the spatial channel information by transmitting a reservation response signal (e.g., the reservation response signal 712) indicating a channel variation parameter (e.g., associated with a Doppler speed) as shown in the schemes 700 and 800. The wireless communication device may determine the first spatial subspace and/or transmission power levels based on the channel variation parameter. For example, the wireless communication device may transmit another communication signal at a reduced transmit power level during the TXOP after transmitting the communication signal.

In an embodiment, the wireless communication device may experience a high channel variation (e.g., a high Doppler). The wireless communication device may complete the transmission of the communication signal before a time (e.g., the time 830) within the TXOP. In some embodiments, the wireless communication device may also transmit only in a beginning portion of the TXOP based on a channel variation parameter indicated by the one or more reservation response signals.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Further embodiments of the present disclosure include a method of wireless communication, comprising transmitting, by a first wireless communication device, one or more reservation response signals indicating spatial channel information in response to a reservation request for a transmission opportunity (TXOP) in a frequency spectrum; and receiving, by the first wireless communication device from a second wireless communication device, a communication signal from a first spatial subspace during the TXOP based on the reservation request.

In some embodiments, wherein the transmitting includes transmitting a first reservation response signal of the one or more reservation response signals in a second spatial subspace before receiving the communication signal; and transmitting a second reservation response signal of the one or more reservation response signals in a third spatial subspace after receiving at least a portion of the communication signal. In some embodiments, wherein the second spatial subspace and the third spatial subspace are the same. In some embodiments, wherein the second spatial subspace and the third spatial subspace are different. In some embodiments, wherein the first reservation response signal includes transmission timing information associated with the second reservation response signal. In some embodiments, wherein the second reservation response signal is transmitted during a predetermined time period within the TXOP. In some embodiments, wherein the transmitting includes transmitting at least one of the one or more reservation response signals in a second spatial subspace including a wider spatial dimension than the first spatial subspace used for the receiving. In some embodiments, the further comprises determining, by the first wireless communication device, that a channel variation is above a predetermined threshold. In some embodiments, wherein the transmitting includes transmitting at least one of the one or more reservation response signals using an omnidirectional beam. In some embodiments, wherein a first reservation response signal of the one or more reservation response signals indicates a channel variation parameter. In some embodiments, wherein the channel variation parameter is associated with a Doppler speed. In some embodiments, wherein a first reservation response signal of the one or more reservation response signals indicates that spatial sharing is disallowed in the TXOP based on at least one of a Doppler speed, a channel reciprocity, a transmit-receive antenna ratio, or a channel phase response.

Further embodiments of the present disclosure include a method of wireless communication, comprising receiving, by a first wireless communication device from a second wireless communication device, one or more reservation response signals indicating spatial channel information related to a reservation request for a transmission opportunity (TXOP) in a frequency spectrum; and transmitting, by the first wireless communication device to a third wireless communication device, a communication signal during the TXOP in a first spatial subspace based on the received one or more reservation response signals.

In some embodiments, wherein the receiving includes receiving a first reservation response signal of the one or more reservation response signals from a second spatial subspace associated with the reservation request before transmitting the communication signal, the first spatial subspace and the second spatial subspace including different spatial dimensions; and receiving a second reservation response signal of the one or more reservation response signals from a third spatial subspace associated with the reservation request after transmitting at least a portion of the communication signal. In some embodiments, the method further comprises determining, by the first wireless communication device, that the second spatial subspace and the third spatial subspace are different; and transmitting, by the first wireless communication device to the third wireless communication device, a second communication signal in a fourth spatial subspace during the TXOP based on the determining and the received second reservation response signal, the fourth spatial subspace and the third spatial subspace including different spatial dimensions. In some embodiments, the method further comprises determining, by the first wireless communication device, that the second spatial subspace and the third spatial subspace are the same. In some embodiments, wherein the first reservation response signal includes transmission timing information associated with the second reservation response signal. In some embodiments, wherein the second reservation response signal is received during a predetermined time period within the TXOP. In some embodiments, wherein a first reservation response signal of the one or more reservation response signals indicates a channel variation parameter. In some embodiments, wherein the transmitting includes completing the transmission of the communication signal before a time within the TXOP based on at least one of the channel variation parameter or a spatial channel variation detected by the first wireless communication device. In some embodiments, the method further comprises transmitting, by the first wireless communication device to the third wireless communication device, another communication signal during the TXOP after transmitting the communication signal, the another communication signal transmitted at a lower transmit power than the communication signal based on the channel variation parameter. In some embodiments, the method further comprises receiving, by the first wireless communication device from a fourth wireless communication device, another reservation response signal related to a reservation request for another TXOP, the another reservation response signal indicating that spatial sharing is disallowed in the another TXOP; and refraining, by the first wireless communication device, from communicating in the frequency spectrum during the another TXOP.

Further embodiments of the present disclosure include an apparatus comprising a transceiver configured to transmit one or more reservation response signals indicating spatial channel variation information in response to a reservation request for a transmission opportunity (TXOP) in a frequency spectrum; and receive, from a second wireless communication device, a communication signal from a first spatial subspace during the TXOP based on the reservation request.

In some embodiments, wherein the transceiver is further configured to transmit the one or more reservation response signals by transmitting a first reservation response signal of the one or more reservation response signals in a second spatial subspace before receiving the communication signal; and transmitting a second reservation response signal of the one or more reservation response signals in a third spatial subspace after receiving at least a portion of the communication signal. In some embodiments, wherein the second spatial subspace and the third spatial subspace are the same. In some embodiments, wherein the second spatial subspace and the third spatial subspace are different. In some embodiments, wherein the first reservation response signal includes transmission timing information associated with the second reservation response signal. In some embodiments, wherein the second reservation response signal is transmitted during a predetermined time period within the TXOP. In some embodiments, wherein the transceiver is further configured to transmit the one or more reservation response signals by transmitting at least one of the one or more reservation response signals in a second spatial subspace including a wider spatial dimension than the first spatial subspace used for receiving the communication signal. In some embodiments, the apparatus further comprises a processor configured to determine that a channel variation is above a predetermined threshold. In some embodiments, wherein the transceiver is further configured to transmit the one or more reservation response signals by transmitting at least one of the one or more reservation response signals using an omnidirectional beam. In some embodiments, wherein a first reservation response signal of the one or more reservation response signals indicates a channel variation parameter. In some embodiments, wherein the channel variation parameter is associated with a Doppler speed. In some embodiments, wherein a first reservation response signal of the one or more reservation response signals indicates that spatial sharing is disallowed in the TXOP based on at least one of a Doppler speed, a channel reciprocity, a transmit-receive antenna ratio, or a channel phase response.

Further embodiments of the present disclosure include an apparatus comprises a transceiver configured to receive, from a second wireless communication device, one or more reservation response signals indicating spatial channel variation information related to a reservation request for a transmission opportunity (TXOP) in a frequency spectrum; and transmit, to a third wireless communication device, a communication signal during the TXOP in a first spatial subspace based on the received one or more reservation response signals.

In some embodiments, wherein the transceiver is further configured to receive the one or more reservation response signals by receiving a first reservation response signal of the one or more reservation response signals from a second spatial subspace associated with the reservation request before transmitting the communication signal, the first spatial subspace and the second spatial subspace including different spatial dimensions; and receiving a second reservation response signal of the one or more reservation response signals from a third spatial subspace associated with the reservation request after transmitting at least a portion of the communication signal. In some embodiments, the apparatus further comprises a processor configured to determine that the second spatial subspace and the third spatial subspace are different, wherein the transceiver is further configured to transmit, to the third wireless communication device, a second communication signal in a fourth spatial subspace during the TXOP based on the determination and the received second reservation response signal, the fourth spatial subspace and the third spatial subspace including different spatial dimensions. In some embodiments, the apparatus further comprises a processor configured to determine that the second spatial subspace and the third spatial subspace are the same. In some embodiments, wherein the first reservation response signal includes transmission timing information associated with the second reservation response signal. In some embodiments, wherein the second reservation response signal is received during a predetermined time period within the TXOP. In some embodiments, wherein a first reservation response signal of the one or more reservation response signals indicates a channel variation parameter. In some embodiments, wherein the transceiver is further configured to transmit the communication signal by completing the transmission of the communication signal before a time within the TXOP based on at least one of the channel variation parameter or a spatial channel variation detected by the apparatus. In some embodiments, wherein the transceiver is further configured to transmit, to the third wireless communication device, another communication signal during the TXOP after transmitting the communication signal, the another communication signal transmitted at a lower transmit power than the communication signal based on the channel variation parameter. In some embodiments, wherein the transceiver is further configured to receive, from a fourth wireless communication device, another reservation response signal related to a reservation request for another TXOP, the another reservation response signal indicating that spatial sharing is disallowed in the another TXOP; and refrain from communicating in the frequency spectrum during the another TXOP.

Further embodiments of the present disclosure include a computer-readable medium having program code recorded thereon, the program code comprising code for causing a first wireless communication device to transmit one or more reservation response signals indicating spatial channel variation information in response to a reservation request for a transmission opportunity (TXOP) in a frequency spectrum; and code for causing the first wireless communication device to receive, from a second wireless communication device, a communication signal from a first spatial subspace during the TXOP based on the reservation request.

In some embodiments, wherein the code for causing the first wireless communication device to transmit the one or more reservation response signals is further configured to transmit a first reservation response signal of the one or more reservation response signals in a second spatial subspace before receiving the communication signal; and transmit a second reservation response signal of the one or more reservation response signals in a third spatial subspace after receiving at least a portion of the communication signal. In some embodiments, wherein the second spatial subspace and the third spatial subspace are the same. In some embodiments, wherein the second spatial subspace and the third spatial subspace are different. In some embodiments, wherein the first reservation response signal includes transmission timing information associated with the second reservation response signal. In some embodiments, wherein the second reservation response signal is transmitted during a predetermined time period within the TXOP. In some embodiments, wherein the code for causing the first wireless communication device to transmit the one or more reservation response signals is further configured to transmit at least one of the one or more reservation response signals in a second spatial subspace including a wider spatial dimension than the first spatial subspace used for receiving the communication signal. In some embodiments, the computer-readable medium further comprises code for causing the first wireless communication device to determine that a channel variation is above a predetermined threshold. In some embodiments, wherein the code for causing the first wireless communication device to transmit the one or more reservation response signals is further configured to transmit at least one of the one or more reservation response signals using an omnidirectional beam. In some embodiments, wherein a first reservation response signal of the one or more reservation response signals indicates a channel variation parameter. In some embodiments, wherein the channel variation parameter is associated with a Doppler speed. In some embodiments, wherein a first reservation response signal of the one or more reservation response signals indicates that spatial sharing is disallowed in the TXOP based on at least one of a Doppler speed, a channel reciprocity, a transmit-receive antenna ratio, or a channel phase response.

Further embodiments of the present disclosure include a computer-readable medium having program code recorded thereon, the program code comprises code for causing a first wireless communication device to receive, from a second wireless communication device, one or more reservation response signals indicating spatial channel variation information related to a reservation request for a transmission opportunity (TXOP) in a frequency spectrum; and code for causing the first wireless communication device to transmit, to a third wireless communication device, a communication signal during the TXOP in a first spatial subspace based on the received one or more reservation response signals.

In some embodiments, wherein the code for causing the first wireless communication device to receive the one or more reservation response signals is further configured to receive a first reservation response signal of the one or more reservation response signals from a second spatial subspace associated with the reservation request before transmitting the communication signal, the first spatial subspace and the second spatial subspace including different spatial dimensions; and receive a second reservation response signal of the one or more reservation response signals from a third spatial subspace associated with the reservation request after transmitting at least a portion of the communication signal. In some embodiments, the computer-readable medium further comprises code for causing the first wireless communication device to determine that the second spatial subspace and the third spatial subspace are different; and code for causing the first wireless communication device to transmit, to the third wireless communication device, a second communication signal in a fourth spatial subspace during the TXOP based on the determination and the received second reservation response signal, the fourth spatial subspace and the third spatial subspace including different spatial dimensions. In some embodiments, the computer-readable medium further comprises code for causing the first wireless communication device to determine that the second spatial subspace and the third spatial subspace are the same. In some embodiments, wherein the first reservation response signal includes transmission timing information associated with the second reservation response signal. In some embodiments, wherein the second reservation response signal is received during a predetermined time period within the TXOP. In some embodiments, wherein a first reservation response signal of the one or more reservation response signals indicates a channel variation parameter. In some embodiments, wherein the code for causing the first wireless communication device to transmit the communication signal is further configured to complete the transmission of the communication signal before a time within the TXOP based on least one of the channel variation parameter or a spatial channel variation detected by the first wireless communication device. In some embodiments, the computer-readable medium further comprises code for causing the first wireless communication device to transmit, to the third wireless communication device, another communication signal during the TXOP after transmitting the communication signal, the another communication signal transmitted at a lower transmit power than the communication signal based on the channel variation parameter. In some embodiments, the computer-readable medium further comprises code for causing the first wireless communication device to receive, from a fourth wireless communication device, another reservation response signal related to a reservation requests for another TXOP, the another reservation response signal indicating that spatial sharing is disallowed in the another TXOP; and code for causing the first wireless communication device to refrain from communicating in the frequency spectrum during the another TXOP.

Further embodiments of the present disclosure include an apparatus comprising means for transmitting one or more reservation response signals indicating spatial channel variation information in response to a reservation request for a transmission opportunity (TXOP) in a frequency spectrum; and means for receiving, from a second wireless communication device, a communication signal from a first spatial subspace during the TXOP based on the reservation request.

In some embodiments, wherein the means for transmitting the one or more reservation response signals is further configured to transmit a first reservation response signal of the one or more reservation response signals in a second spatial subspace before receiving the communication signal; and transmit a second reservation response signal of the one or more reservation response signals in a third spatial subspace after receiving at least a portion of the communication signal. In some embodiments, wherein the second spatial subspace and the third spatial subspace are the same. In some embodiments, wherein the second spatial subspace and the third spatial subspace are different. In some embodiments, wherein the first reservation response signal includes transmission timing information associated with the second reservation response signal. In some embodiments, wherein the second reservation response signal is transmitted during a predetermined time period within the TXOP. In some embodiments, wherein the means for transmitting the one or more reservation response signals is further configured to transmit at least one of the one or more reservation response signals in a second spatial subspace including a wider spatial dimension than the first spatial subspace used for receiving the communication signal. In some embodiments, the apparatus further comprises means for determining that a channel variation is above a predetermined threshold. In some embodiments, wherein the means for transmitting the one or more reservation response signals is further configured to transmit at least one of the one or more reservation response signals using an omnidirectional beam. In some embodiments, wherein a first reservation response signal of the one or more reservation response signals indicates a channel variation parameter. In some embodiments, wherein the channel variation parameter is associated with a Doppler speed. In some embodiments, wherein a first reservation response signal of the one or more reservation response signals indicates that spatial sharing is disallowed in the TXOP based on at least one of a Doppler speed, a channel reciprocity, a transmit-receive antenna ratio, or a channel phase response.

Further embodiments of the present disclosure include an apparatus comprising means for receiving, from a second wireless communication device, one or more reservation response signals indicating spatial channel variation information related to a reservation request for a transmission opportunity (TXOP) in a frequency spectrum; and means for transmitting, to a third wireless communication device, a communication signal during the TXOP in a first spatial subspace based on the received one or more reservation response signals.

In some embodiments, wherein the means for receiving the one or more reservation response signals is further configured to receive a first reservation response signal of the one or more reservation response signals from a second spatial subspace associated with the reservation request before transmitting the communication signal, the first spatial subspace and the second spatial subspace including different spatial dimensions; and receive a second reservation response signal of the one or more reservation response signals from a third spatial subspace associated with the reservation request after transmitting at least a portion of the communication signal. In some embodiments, the apparatus further comprises means for determining that the second spatial subspace and the third spatial subspace are different; and means for transmitting, to the third wireless communication device, a second communication signal in a fourth spatial subspace during the TXOP based on the determination and the received second reservation response signal, the fourth spatial subspace and the third spatial subspace including different spatial dimensions. In some embodiments, the apparatus further comprises means for determining that the second spatial subspace and the third spatial subspace are the same. In some embodiments, wherein the first reservation response signal includes transmission timing information associated with the second reservation response signal. In some embodiments, wherein the second reservation response signal is received during a predetermined time period within the TXOP. In some embodiments, wherein a first reservation response signal of the one or more reservation response signals indicates a channel variation parameter. In some embodiments, wherein the means for transmitting the communication signal is further configured to complete the transmission of the communication signal before a time within the TXOP based on at least one of the channel variation parameter or a spatial channel variation detected by the apparatus. In some embodiments, the apparatus further comprises means for transmitting, to the third wireless communication device, another communication signal during the TXOP after transmitting the communication signal, the another communication signal transmitted at a lower transmit power than the communication signal based on the channel variation parameter. In some embodiments, the apparatus further comprises means for receiving, from a fourth wireless communication device, another reservation response signal related to a reservation request for another TXOP, the another reservation response signal indicating that spatial sharing is disallowed in the another TXOP; and means for refraining from communicating in the frequency spectrum during the another TXOP.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a first wireless communication device from a second wireless communication device, a reservation request for a transmission opportunity (TXOP) in a frequency spectrum;
transmitting, by the first wireless communication device to the second wireless communication device, a first reservation response signal in response to the reservation request, the first reservation response signal indicating first spatial channel information and whether spatial sharing is disallowed for a first portion of a communication signal based on a channel variation parameter;
receiving, by the first wireless communication device from the second wireless communication device, the first portion of the communication signal during the TXOP based on the reservation request;
transmitting, by the first wireless communication device to the second wireless communication device, a second reservation response signal in response to receiving the first portion of the communication signal, the second reservation response signal indicating second spatial channel information and whether spatial sharing is disallowed for a second portion of the communication signal based on the channel variation parameter; and
receiving, by the first wireless communication device from the second wireless communication device, the second portion of the communication signal during the TXOP.

2. The method of claim 1, wherein:
the transmitting the first reservation response signal includes transmitting the first reservation response signal in a first spatial subspace;
the receiving the first portion of the communication signal includes receiving the first portion of the communication signal in a second spatial subspace;
the transmitting the second reservation response signal includes transmitting the second reservation response signal in a third spatial subspace; and
the receiving the second portion of the communication signal includes receiving the second portion of the communication signal in a fourth spatial subspace.

3. The method of claim 2, wherein the first, second, third, and fourth spatial subspaces are the same.

4. The method of claim 2, wherein at least one of the first, second, third, or fourth spatial subspaces is different from at least one other of the first, second, third, or fourth spatial subspaces.

5. The method of claim 1, wherein the first reservation response signal includes transmission timing information associated with the second reservation response signal.

6. The method of claim 1, wherein the second reservation response signal is transmitted during a predetermined time period within the TXOP.

7. The method of claim 1, further comprising:
determining, by the first wireless communication device, that the channel variation parameter is above a predetermined threshold,
wherein the receiving the reservation request includes receiving the reservation request in a first spatial subspace, the first spatial subspace being narrower than a second spatial subspace on which the first reservation response signal is transmitted.

8. The method of claim 1, wherein at least one of the transmitting the first reservation response signal or the transmitting the second reservation response signal includes transmitting using an omnidirectional beam.

9. The method of claim 1, wherein the channel variation parameter comprises at least one of a Doppler speed, a channel reciprocity, a transmit-receive antenna ratio, or a channel phase response.

10. A method of wireless communication, comprising:
receiving, by a first wireless communication device from a second wireless communication device, a first reservation response signal indicating spatial channel information related to a reservation request for a transmission opportunity (TXOP) in a frequency spectrum and whether spatial sharing is disallowed for a first communication signal based on a channel variation parameter;
transmitting, by the first wireless communication device to a third wireless communication device, the first communication signal during the TXOP based on the first reservation response signal;
receiving, by the first wireless communication device from the second wireless communication device, a second reservation response signal related to the reservation request indicating whether spatial sharing is disallowed for a second communication signal based on the channel variation parameter, wherein the receiving the second reservation response signal comprises receiving the second reservation response signal after the transmitting the first communication signal; and
transmitting, by the first wireless communication device to the third wireless communication device, the second communication signal during the TXOP based on the received second reservation response signal.

11. The method of claim 10, wherein:
the receiving the first reservation response signal includes receiving the first reservation response signal in a first spatial subspace; and
the transmitting the first communication signal includes transmitting the first communication signal in a second spatial subspace, the second spatial subspace being different from the first spatial subspace.

12. The method of claim 11, wherein:
the receiving the second reservation response signal includes receiving the second reservation response signal in a third spatial subspace, the third spatial subspace being different from the first spatial subspace; and
the transmitting the second communication signal includes transmitting the second communication signal in a fourth spatial subspace, the fourth spatial subspace being different from the third spatial subspace.

13. The method of claim 10, wherein the first reservation response signal includes transmission timing information associated with the second reservation response signal.

14. The method of claim 10, wherein the second reservation response signal is received during a predetermined time period within the TXOP.

15. The method of claim 10, wherein at least one of the first or second reservation response signals indicates the channel variation parameter.

16. The method of claim 15, further comprising:
refraining, by the first wireless communication device, from transmitting the first or second communication signal after a time within the TXOP based on at least one of the channel variation parameter or a spatial channel variation detected by the first wireless communication device.

17. The method of claim 15, wherein the second communication signal is transmitted at a lower transmit power than the first communication signal, based on the channel variation parameter.

18. The method of claim 10, further comprising:
receiving, by the first wireless communication device from a fourth wireless communication device, a third reservation response signal related to a reservation request for a second TXOP, the third reservation response signal indicating that spatial sharing is disallowed in the second TXOP; and
refraining, by the first wireless communication device, from communicating in the frequency spectrum during the second TXOP.

19. An apparatus comprising: a transceiver configured to:
receive, from a second wireless communication device, a reservation request for a transmission opportunity (TXOP) in a frequency spectrum;
transmit a first reservation response signal in response to the reservation request, the first reservation response signal indicating first spatial channel information and whether spatial sharing is disallowed for a first portion of a communication signal based on a channel variation parameter;
receive, from the second wireless communication device, the first portion of the communication signal during the TXOP based on the reservation request;
transmit a second reservation response signal in response to receiving the first portion of the communication signal, the second reservation response signal indicating second spatial channel information and whether spatial sharing is disallowed for a second portion of the communication signal based on the channel variation parameter; and
receive, from the second wireless communication device, the second portion of the communication signal during the TXOP.

20. The apparatus of claim 19, wherein the transceiver is further configured to:
transmit the first reservation response signal by transmitting the first reservation response signal in a first spatial subspace;
receive the first portion of the communication signal by receiving the first portion of the communication signal in a second spatial subspace;
transmit the second reservation response signal by transmitting the second reservation response signal in a third spatial subspace; and
receive the second portion of the communication signal by receiving the second portion of the communication signal in a fourth spatial subspace,
wherein at least one of the first, second, third, or fourth spatial subspaces is different from at least one other of the first, second, third, or fourth spatial subspaces.

21. The apparatus of claim 19, wherein the second reservation response signal is transmitted during at least one of:
a time period determined based on transmission timing information included in the first reservation response signal; or
a predetermined time period.

22. The apparatus of claim 19, wherein the first reservation response signal indicates that spatial sharing is disallowed in the TXOP based on at least one of a Doppler speed, a channel reciprocity, a transmit-receive antenna ratio, or a channel phase response.

23. An apparatus comprising:
a transceiver configured to:
receive, from a second wireless communication device, a first reservation response signal indicating spatial channel information related to a reservation request for a transmission opportunity (TXOP) in a frequency spectrum and whether spatial sharing is disallowed for a first communication signal based on a channel variation parameter;

transmit, to a third wireless communication device, the first communication signal during the TXOP based on the first reservation response signal;

receive, from the second wireless communication device, a second reservation response signal related to the reservation request indicating whether spatial sharing is disallowed for a second communication signal based on the channel variation parameter, wherein the receiving the second reservation response signal comprises receiving the second reservation response signal after the transmitting the first communication signal; and transmit, to the third wireless communication device, the second communication signal during the TXOP based on the second reservation response signal.

24. The apparatus of claim 23, wherein the transceiver is further configured to:

receive the first reservation response signal in a first spatial subspace; and transmit the first communication signal in a second spatial subspace, the second spatial subspace being different from the first spatial subspace.

25. The apparatus of claim 24, wherein the transceiver is further configured to:

receive the second reservation response in a third spatial subspace, the third spatial subspace being different from the first spatial subspace; and transmit the second communication signal in a fourth spatial subspace, the fourth spatial subspace being different from the third spatial subspace.

26. The apparatus of claim 23, wherein the transceiver is further configured to receive the second reservation response signal during at least one of:

a time period determined based on transmission timing information included in the first reservation response signal; or a predetermined time period.

27. The apparatus of claim 23, wherein the transceiver is further configured to at least one of:

refrain from transmitting the first or second communication signal after a time within the TXOP based on at least one of the channel variation parameter or a spatial channel variation detected by the apparatus; or transmit the second communication signal during the TXOP at a lower transmit power than the first communication signal based on the channel variation parameter.

28. The apparatus of claim 23, wherein the transceiver is further configured to:

receive, from a fourth wireless communication device, a third reservation response signal related to a reservation request for a second TXOP, the third reservation response signal indicating that spatial sharing is disallowed in the second TXOP; and refrain from communicating in the frequency spectrum during the second TXOP.

* * * * *